US012776211B2

(12) United States Patent
Iwaki

(10) Patent No.: US 12,776,211 B2
(45) Date of Patent: Oct. 27, 2026

(54) INFORMATION PROCESSING SYSTEM AND SPEED LIMIT ACQUIRING APPARATUS

(71) Applicant: TOYOTA JIDOSHA KABUSHIKI KAISHA, Toyota (JP)

(72) Inventor: Yoshiya Iwaki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 286 days.

(21) Appl. No.: 18/430,972

(22) Filed: Feb. 2, 2024

(65) Prior Publication Data

US 2024/0265806 A1 Aug. 8, 2024

(30) Foreign Application Priority Data

Feb. 7, 2023 (JP) ................................ 2023-016716
Oct. 17, 2023 (JP) ................................ 2023-178968

(51) Int. Cl.

*G08G 1/0967* (2006.01)
*B60W 30/14* (2006.01)
*B60W 50/00* (2006.01)
*G06V 20/58* (2022.01)

(52) U.S. Cl.

CPC ..... *G08G 1/096708* (2013.01); *B60W 30/143* (2013.01); *B60W 50/00* (2013.01); *G06V 20/582* (2022.01); *B60W 2050/0026* (2013.01); *B60W 2420/403* (2013.01); *B60W 2555/60* (2020.02)

(58) Field of Classification Search

CPC .......... G08G 1/096708; G06V 20/582; B60W 30/143; B60W 50/00; B60W 2555/60; B60W 2050/0026; B60W 2420/403

See application file for complete search history.

(56) References Cited

U.S. PATENT DOCUMENTS

| | | | |
|---|---|---|---|
| 9,835,468 B2 | 12/2017 | Yoshitomi et al. | |
| 9,937,923 B2 * | 4/2018 | Custer | G08G 1/09623 |
| 10,017,178 B2 * | 7/2018 | Morimoto | B60W 30/14 |
| 10,132,642 B2 | 11/2018 | Yoshitomi et al. | |
| 10,354,156 B2 * | 7/2019 | Nishimura | G06V 20/582 |
| 10,679,077 B2 * | 6/2020 | Kinoshita | G06F 18/24133 |
| 11,010,624 B2 | 5/2021 | Hayashi et al. | |
| 11,017,247 B2 * | 5/2021 | Hayashi | G06T 7/90 |
| 11,117,595 B2 | 9/2021 | Sasaki et al. | |
| 12,208,816 B2 * | 1/2025 | Iwaki | B60W 30/143 |

(Continued)

FOREIGN PATENT DOCUMENTS

| | | |
|---|---|---|
| DE | 10 2014 204 618 A1 | 9/2015 |
| JP | 2014-067185 A | 4/2014 |

(Continued)

*Primary Examiner* — Peter D Nolan
*Assistant Examiner* — Wae L Louie
(74) *Attorney, Agent, or Firm* — Oliff PLC

(57) ABSTRACT

An information processing system is applied to a vehicle. The information processing system includes: one or more processors configured to acquire information on a posted traffic rule that is a traffic rule indicated by a traffic sign installed on a road where the vehicle travels, acquire information on a first traffic rule applied to the vehicle, based on the posted traffic rule and a first vehicle category that is a vehicle category of the vehicle, and notify a user of the vehicle of the first traffic rule or control travelling of the vehicle based on the first traffic rule.

5 Claims, 10 Drawing Sheets

(56) References Cited

U.S. PATENT DOCUMENTS

| | | | | |
|---|---|---|---|---|
| 2015/0057831 | A1 | 2/2015 | Finlow-Bates | |
| 2017/0088175 | A1* | 3/2017 | Okuda | B62D 15/025 |
| 2021/0247526 | A1 | 8/2021 | Kijima | |
| 2023/0264707 | A1* | 8/2023 | Iwaki | B60W 30/143<br>340/441 |
| 2024/0265806 | A1* | 8/2024 | Iwaki | G08G 1/096708 |
| 2025/0136137 | A1* | 5/2025 | Saito | G08G 1/09675 |
| 2025/0256575 | A1* | 8/2025 | Iwaki | B60K 35/28 |

FOREIGN PATENT DOCUMENTS

| | | | |
|---|---|---|---|
| JP | 2017138132 | A | 8/2017 |
| SE | 541 108 | C2 | 4/2019 |
| WO | 2021002239 | A1 | 1/2021 |

* cited by examiner

< CONVERSION TABLE 123>

| POSTED SPEED LIMIT (VL-S) | PRESCRIBED SPEED LIMIT (VL-P) | |
|---|---|---|
| | PASSENGER CAR | LARGE VEHICLE |
| 5kph - 90kph | EQUAL TO VL-S (CONVERSION IS NOT NEEDED) | |
| 100kph | 100kph | 80kph |
| 110kph | 110kph | 90kph |
| 120kph | 120kph | 90kph |

< CONVERSION TABLE 123 >

| POSTED SPEED LIMIT (VL-S) | PRESCRIBED SPEED LIMIT (VL-P) | | | | | |
|---|---|---|---|---|---|---|
| | M1 | M2 | M3 | N1 | N2 | N3 |
| 5kph - 90kph | EQUAL TO VL-S (CONVERSION IS NOT NEEDED) | | | | | |
| 100kph | 100kph | 90kph | 80kph | 80kph | 80kph | 80kph |
| 110kph | 110kph | 100kph | 90kph | 90kph | 90kph | 90kph |
| 120kph | 120kph | 100kph | 90kph | 90kph | 90kph | 90kph |

INFORMATION PROCESSING SYSTEM AND SPEED LIMIT ACQUIRING APPARATUS

CROSS-REFERENCE TO RELATED APPLICATION

This application claims priority to Japanese Patent Application No. 2023-016716 filed on Feb. 7, 2023, and Japanese Patent Application No. 2023-178968 filed on Oct. 17, 2023, each incorporated herein by reference in its entirety.

BACKGROUND

1. Technical Field

The present disclosure relates to an information processing system and a speed limit acquiring apparatus.

2. Description of Related Art

Japanese Unexamined Patent Application Publication No. 2014-067185 discloses a driving support apparatus. The driving support apparatus identifies the content of a main sign and an auxiliary sign constituting a road sign installed on a travelling path of a vehicle. When a travelling condition of the vehicle corresponds to a regulatory condition displayed on the auxiliary sign of the road sign, the driving support apparatus warns a driver based on the content of a regulation indicated by the main sign.

SUMMARY

In order to acquire information on a traffic rule (example: a speed limit) applied to a vehicle, one can consider recognizing a traffic sign installed on a road where the vehicle is travelling. Note that the traffic rule indicated by the traffic sign is not necessarily applied to all vehicles.

The present disclosure provides a technology to enable acquiring information on a traffic rule applied to a vehicle.

An information processing system according to a first aspect of the present disclosure is applied to a vehicle. The information processing system includes: one or more processors configured to acquire information on a posted traffic rule that is a traffic rule indicated by a traffic sign installed on a road where the vehicle travels, acquire information on a first traffic rule applied to the vehicle, based on the posted traffic rule and a first vehicle category that is a vehicle category of the vehicle, and notify a user of the vehicle of the first traffic rule or control travelling of the vehicle based on the first traffic rule.

A speed limit acquiring apparatus configured to acquire information on a speed limit according to a second aspect of the present disclosure is applied to a vehicle. The speed limit acquiring apparatus includes: one or more storage devices that stores a table indicating a corresponding relation between a posted speed limit indicated by a speed limit sign and a prescribed speed limit beforehand prescribed for each vehicle category; and one or more processors configured to acquire information on the posted speed limit indicated by the speed limit sign installed on a road where the vehicle travels, and acquire, as a first speed limit that is the speed limit that is applied to the vehicle, the prescribed speed limit that is associated with the posted speed limit and a first vehicle category, based on the table, the first vehicle category being the vehicle category of the vehicle.

According to the present disclosure, information on a traffic rule applied to a vehicle can be acquired.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. First Embodiment 1-1. Speed Limit Acquiring Apparatus

Figure 1:
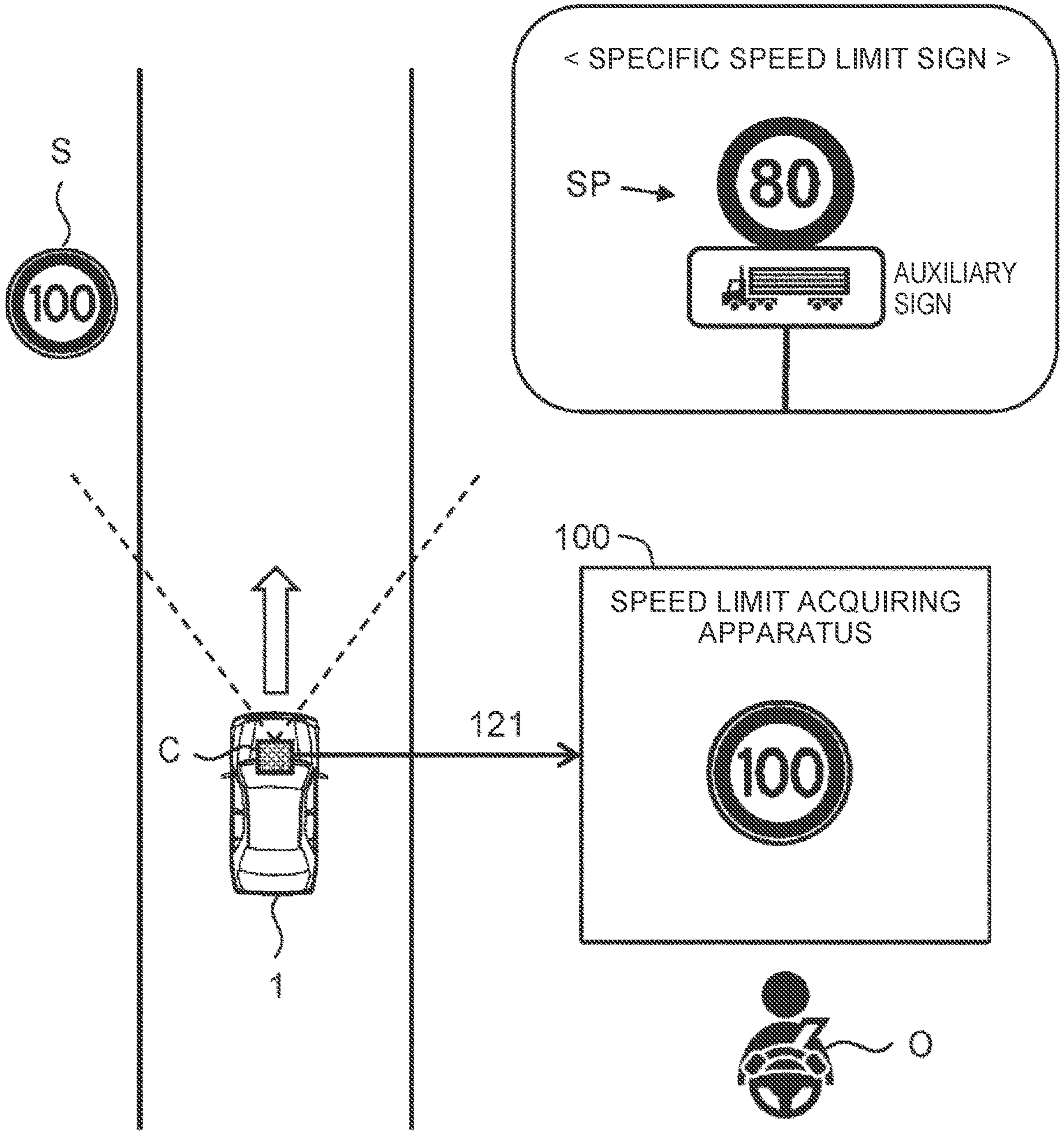
FIG. 1 is a conceptual diagram for explaining an outline of a speed limit acquiring apparatus according to a first embodiment.

FIG. 1 is a conceptual diagram for explaining an outline of a speed limit acquiring apparatus 100. The speed limit acquiring apparatus 100 is applied to a vehicle 1. For example, the vehicle 1 is manually driven by an operator. The operator of the vehicle 1 may be a driver boarding on the vehicle 1 or may be a remote operator that performs remote manipulation (remote driving or remote support) for the vehicle 1. As another example, the vehicle 1 may be an autonomous vehicle controlled by an autonomous driving system.

The speed limit acquiring apparatus 100 acquires information on a speed limit with respect to the vehicle 1 on a road where the vehicle 1 travels. For example, the speed limit is reported to a user O of the vehicle 1. The user O of the vehicle 1 is the operator of the vehicle 1 or an occupant on board in the vehicle 1 (autonomous vehicle). As another example, the speed limit may be used for control of the vehicle 1.

In order to acquire the information on the speed limit with respect to the vehicle 1, one can consider recognizing a speed limit sign S installed on a road where the vehicle 1 is travelling. An in-vehicle camera C mounted on the vehicle 1 is used for recognizing the speed limit sign S. The in-vehicle camera C images a situation around the vehicle 1 and acquires an image 121 indicating the situation around the vehicle 1. The speed limit acquiring apparatus 100 acquires the image 121 obtained by the in-vehicle camera C and recognizes the speed limit sign S by analyzing the image 121. Furthermore, the speed limit acquiring apparatus 100 reads information (number) described on the speed limit sign S based on the image of the recognized speed limit sign S. As above, the speed limit acquiring apparatus 100 can acquire the information on the speed limit indicated by the speed limit sign S installed on the road where the vehicle 1 travels.

The speed limit indicated by the speed limit sign S, that is, the speed limit described on the speed limit sign S is hereinafter called “posted speed limit VL-S”.

Herein, vehicle categories (types of vehicles) are considered. A vehicle category is defined based on a vehicle size, the number of occupants, applications, and the like. Examples of the vehicle categories include passenger car and large vehicle. There are also known the vehicle categories M, N, and the like in Europe. The vehicle category M indicates vehicles having at least four wheels and used for transportation of passengers. The vehicle category M is further categorized into vehicle categories M1, M2, M3. The vehicle category M1 indicates vehicles including 8 seats or less in addition to a driver’s seat. The vehicle category M2 indicates vehicles including more than 8 seats in addition to a driver’s seat and having the maximum weight of 5 tons or less. The vehicle category M3 indicates vehicles including more than 8 seats in addition to a driver’s seat and having the maximum weight exceeding 5 tons. The vehicle category N is given vehicles having at least four wheels and used for transportation of articles (goods). The vehicle category N is further categorized into vehicle categories N1, N2, N3. The vehicle category N1 indicates vehicles having the maximum weight of 3.5 tons or less. The vehicle category N2 indicates vehicles having the maximum weight exceeding 3.5 tons and not more than 12 tons. The vehicle category N3 indicates vehicles having the maximum weight exceeding 12 tons.

There exist some speed limit signs S that are only with respect to a specific vehicle category. A speed limit sign S with respect to such a specific vehicle category (example: large vehicle) is hereinafter called “specific speed limit sign SP”. For example, the specific speed limit sign SP is constituted of a combination of a main sign and an auxiliary sign. The main sign indicates the posted speed limit VL-S. Meanwhile, the auxiliary sign includes information (example: an icon) indicating the specific vehicle category and indicates whether or not the posted speed limit VL-S indicated by the main sign is applied to the specific vehicle category. For example, the specific speed limit sign SP exemplarily shown in FIG. 1 includes the auxiliary sign arranged beneath the main sign. This auxiliary sign includes an icon for large vehicle and indicates that the posted speed limit VL-S indicated by the main sign is applied only to large vehicles. Notably, there can exist an auxiliary sign indicating that the posted speed limit VL-S indicated by the main sign is not applied to the specific vehicle category.

The vehicle category of the vehicle 1 that the speed limit acquiring apparatus 100 is applied to is hereinafter called “first vehicle category”. When the speed limit acquiring apparatus 100 recognizes the specific speed limit sign SP that is with respect to a specific vehicle category, this specific vehicle category does not necessarily coincide with the first vehicle category. When the specific vehicle category does not coincide with the first vehicle category, accurate information on the speed limit with respect to the vehicle 1 in the first vehicle category cannot be acquired from the specific speed limit sign SP itself.

Therefore, the embodiments propose a technology capable of acquiring accurate information on the speed limit with respect to the vehicle 1 even when a specific vehicle category indicated by the specific speed limit sign SP does not coincide with the first vehicle category.

Figure 2:
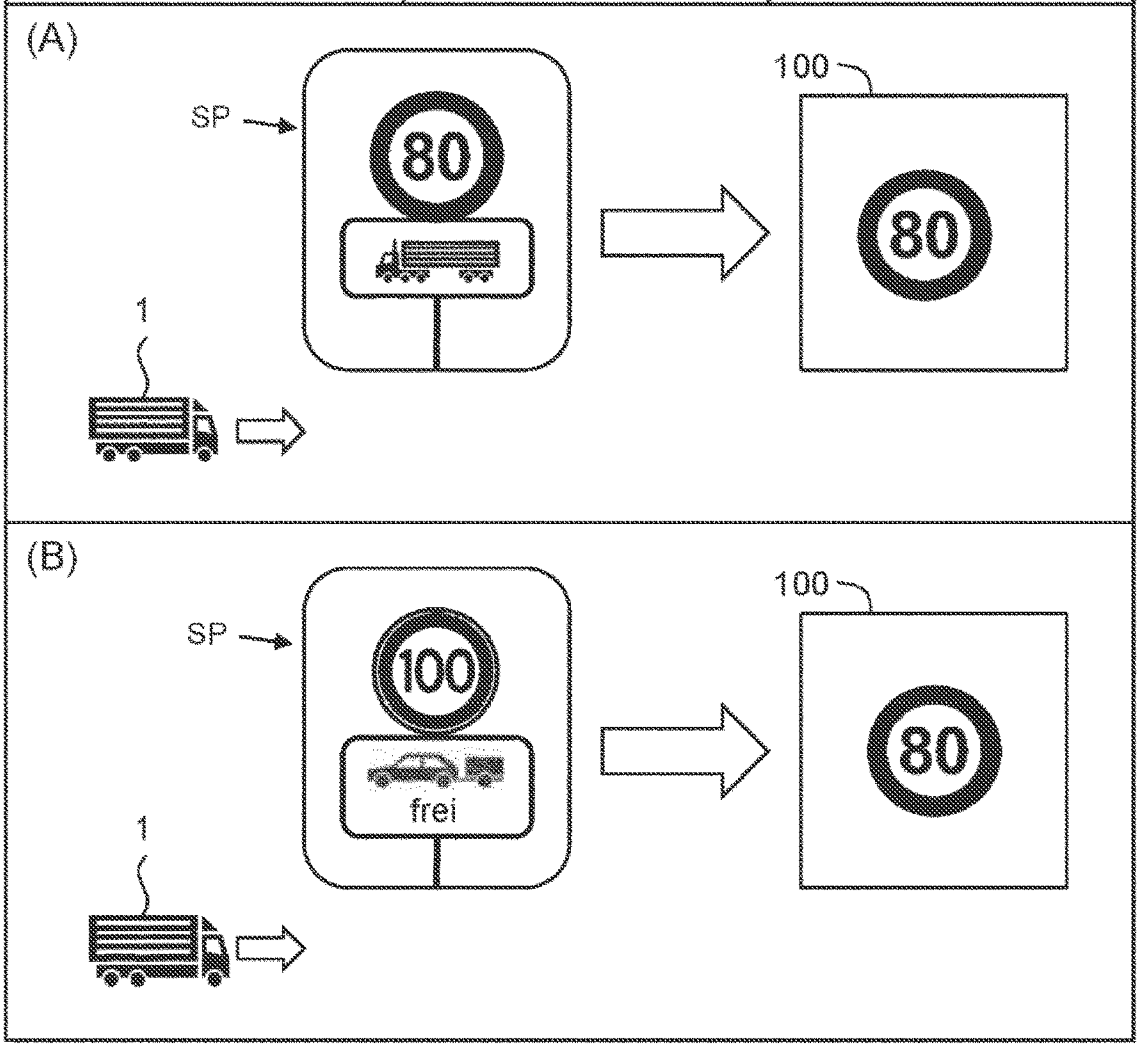
FIG. 2 is a conceptual diagram for explaining an example of processing by the speed limit acquiring apparatus according to the first embodiment.

FIG. 2 is a conceptual diagram for explaining an example of processing by the speed limit acquiring apparatus 100 according to the present embodiment. The speed limit acquiring apparatus 100 has a “conversion table 123”. The conversion table 123 indicates a corresponding relation between the “posted speed limit VL-S” and a “prescribed speed limit VL-P”. The posted speed limit VL-S is the speed limit that is indicated by the speed limit sign S, that is, the speed limit that can be read from the speed limit sign S. Meanwhile, the prescribed speed limit VL-P is the speed limit that is beforehand prescribed for each vehicle category (passenger car, large vehicle, or the like) by the traffic regulations. The speed limit acquiring apparatus 100 uses (refers to) this conversion table 123 and thereby acquires the information on the speed limit that is applied to the vehicle 1 in the first vehicle category (hereinafter called “first speed limit”).

There is considered as an example a case where the first vehicle category of the vehicle 1 to which the speed limit acquiring apparatus 100 is applied is the “large vehicle”. The speed limit acquiring apparatus 100 recognizes the specific speed limit sign SP installed on the road where the vehicle 1 is travelling, and acquires information indicating the content of the specific speed limit sign SP. The information indicating the content of the specific speed limit sign SP includes information on the posted speed limit VL-S indicated by the specific speed limit sign SP (main sign) and information on a specific vehicle category included in the auxiliary sign.

In the case of (A) in FIG. 2, the posted speed limit VL-S indicated by the specific speed limit sign SP (main sign) is 80 kph, and the specific vehicle category included in the auxiliary sign is the large vehicle. The specific vehicle category coincides with the first vehicle category of the vehicle 1. In this case, the speed limit acquiring apparatus 100 acquires the posted speed limit VL-S (80 kph) as the first speed limit applied to the vehicle 1. In this stage, the speed limit acquiring apparatus 100 may acquire the posted speed limit VL-S (80 kph) as the first speed limit without using the conversion table 123.

Meanwhile, in the case of (B) in FIG. 2, the posted speed limit VL-S indicated by the specific speed limit sign SP (main sign) is 100 kph, and the specific vehicle category included in the auxiliary sign is not the large vehicle. The specific vehicle category does not coincide with the first vehicle category of the vehicle 1. In this case, the speed limit acquiring apparatus 100 performs conversion processing using the conversion table 123. According to the conversion table 123, the posted speed limit VL-S (100 kph) is associated with the prescribed speed limit VL-P (100 kph) with respect to the passenger car and the prescribed speed limit VL-P (80 kph) with respect to the large vehicle. Since the first vehicle category is the large vehicle, the posted speed limit VL-S (100 kph) is converted into the prescribed speed limit VL-P (80 kph) with respect to the large vehicle. Namely, the speed limit acquiring apparatus 100 converts the posted speed limit VL-S (100 kph) into the prescribed speed limit VL-P (80 kph) with respect to the large vehicle based on the conversion table 123. Then, the speed limit acquiring apparatus 100 acquires the prescribed speed limit VL-P (80 kph) obtained through the conversion processing as the first speed limit applied to the vehicle 1. In other words, the speed limit acquiring apparatus 100 acquires, as the first speed limit, the prescribed speed limit VL-P (80 kph) associated with the posted speed limit VL-S (100 kph) and the first vehicle category (large vehicle), based on the conversion table 123.

As described above, according to the present embodiment, even when the specific vehicle category indicated by the specific speed limit sign SP does not coincide with the first vehicle category, the accurate information on the speed limit with respect to the vehicle 1 can be acquired.

1-2. Configurational Example of Speed Limit Acquiring Apparatus

The speed limit acquiring apparatus 100 may be mounted on the vehicle 1, may be included in an external apparatus outside the vehicle 1, or may be distributed at a plurality of places. The speed limit acquiring apparatus 100 may be included in a camera ECU that controls the in-vehicle camera C. The speed limit acquiring apparatus 100 may be included in a remote operator terminal for remote manipulation of the vehicle 1.

Figure 3:
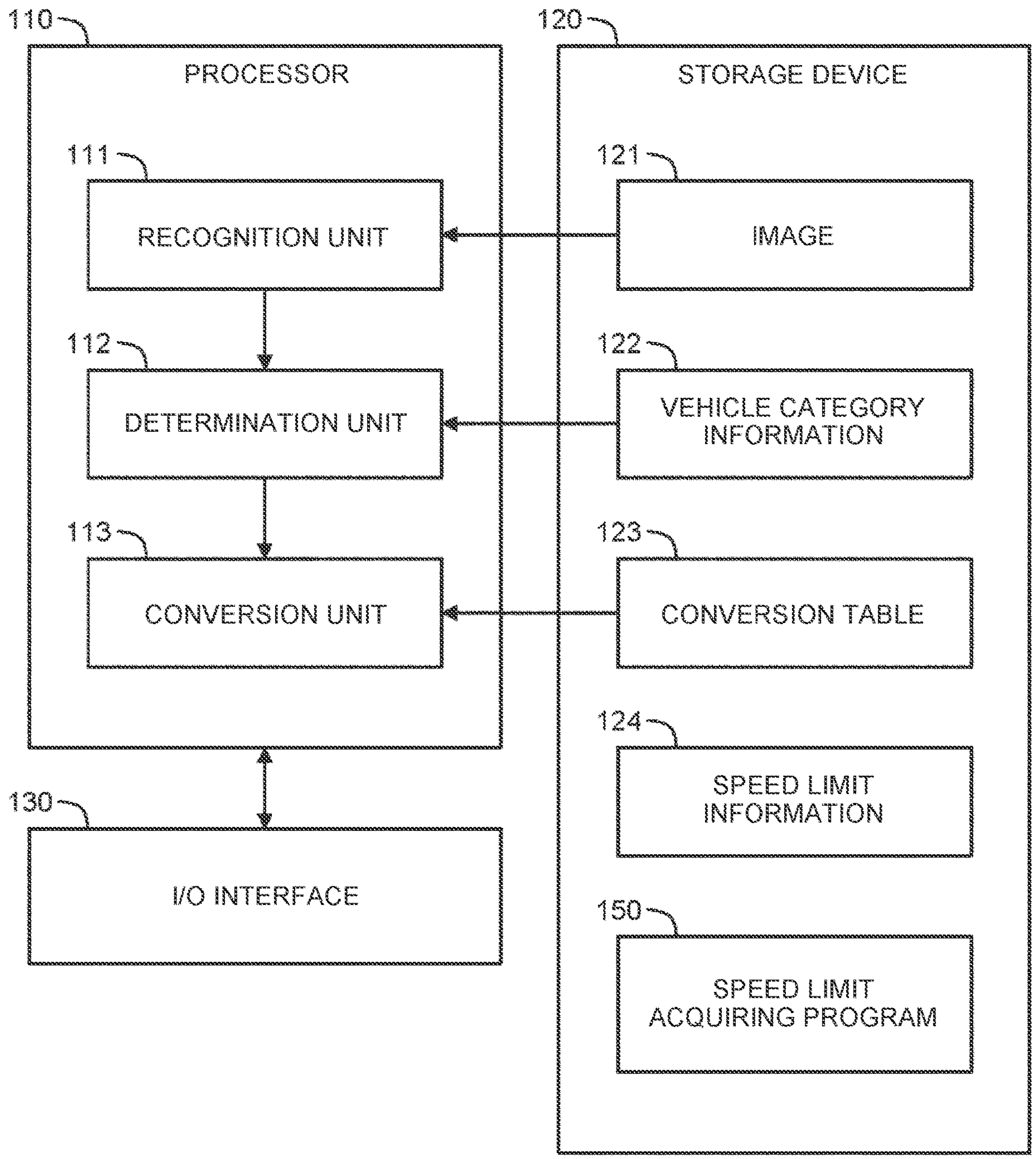
FIG. 3 is a block diagram showing a configurational example of the speed limit acquiring apparatus according to the first embodiment.

FIG. 3 is a block diagram showing a configurational example of the speed limit acquiring apparatus 100. The speed limit acquiring apparatus 100 includes one or a plurality of processors 110 (hereinafter simply called processor 110), one or a plurality of storage devices 120 (hereinafter simply called storage device 120), and an I/O interface 130. The processor 110 performs various kinds of processing. For example, the processor 110 includes a central processing unit (CPU). The storage device 120 stores various kinds of information. Examples of the storage device 120 include a volatile memory, a nonvolatile memory, a hard disk drive (HDD), a solid state drive (SSD), and the like.

The storage device 120 stores the image 121, vehicle category information 122, the conversion table 123, and the like. The image 121 is captured by the in-vehicle camera C mounted on the vehicle 1. The vehicle category information 122 indicates the first vehicle category as the vehicle category of the vehicle 1. For example, the vehicle category information 122 is provided from a manufacturer, an administrator, or a user of the vehicle 1. As exemplarily shown in FIG. 2, the conversion table 123 indicates the corresponding relation between the posted speed limit VL-S indicated by the speed limit sign S and the prescribed speed limit VL-P beforehand prescribed for each vehicle category. The conversion table 123 is beforehand created, and is provided. The processor 110 acquires these pieces of information via the I/O interface 130 and stores them in the storage device 120.

The speed limit acquiring program 150 is a computer program executed by the processor 110. By the processor 110 executing the speed limit acquiring program 150, various kinds of processing by the speed limit acquiring apparatus 100 are realized. The speed limit acquiring program 150 is stored in the storage device 120. Otherwise, the speed limit acquiring program 150 may be recorded in a computer-readable recording medium.

The processor 110 includes, as functional blocks, a recognition unit 111, a determination unit 112, and a conversion unit 113. These functional blocks are realized by the processor 110 executing the speed limit acquiring program 150.

Figure 4:
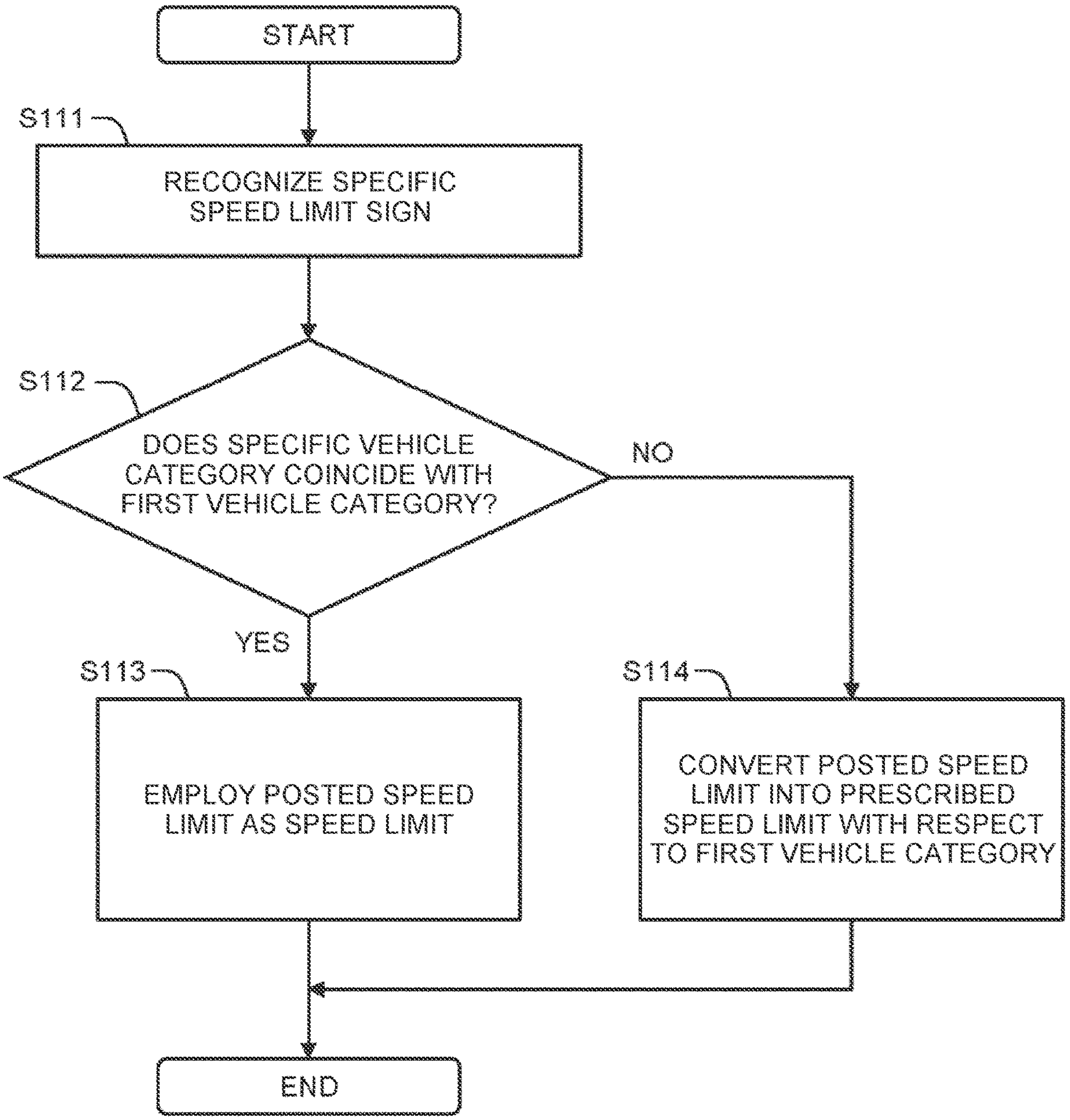
FIG. 4 is a flowchart showing processing by the speed limit acquiring apparatus according to the first embodiment.

FIG. 4 is a flowchart showing processing by the speed limit acquiring apparatus 100. The processing by the speed limit acquiring apparatus 100 will be described with reference to FIG. 3 and FIG. 4.

In step S111, the recognition unit 111 recognizes the speed limit sign S installed on the road where the vehicle 1 is travelling. More in detail, the recognition unit 111 acquires the image 121 obtained by the in-vehicle camera C and recognizes the speed limit sign S by analyzing the image 121. Furthermore, the recognition unit 111 recognizes the number described on the speed limit sign S based on the image of the recognized speed limit sign S. In other words, the speed limit acquiring apparatus 100 acquires the information on the speed limit indicated by the speed limit sign S. Typically, the recognition unit 111 recognizes the speed limit sign S and the speed limit from the image 121 by using an image recognition artificial intelligence (AI). The image recognition AI is beforehand created through a learning technique such as deep learning. For example, the image recognition AI is obtained through learning so as to be able to detect various signs in the image 121 and further identify the types of the detected signs. As another example, the image recognition AI may be obtained through learning so as to be able to detect the speed limit sign S in the image 121. In any of the cases, the speed limit sign S and the speed limit indicated thereby can be recognized by using the in-vehicle camera C and the image recognition AI.

The same holds true for the case where the speed limit sign S is the specific speed limit sign SP with respect to a specific vehicle category. The specific speed limit sign SP is constituted of a combination of the main sign and the auxiliary sign. The main sign indicates the posted speed limit VL-S. Meanwhile, the auxiliary sign includes information (example: an icon) indicating the specific vehicle category and indicates whether or not the posted speed limit VL-S indicated by the main sign is applied to the specific vehicle category. The recognition unit 111 recognizes the main sign and the auxiliary sign from the image 121 by using the image recognition AI. Furthermore, the recognition unit 111 acquires information on the posted speed limit VL-S from the main sign and acquires information on the specific vehicle category from the auxiliary sign. As above, the recognition unit 111 can acquire information indicating the content of the specific speed limit sign SP (the posted speed limit VL-S and the specific vehicle category).

There is hereafter considered a case where the recognized speed limit sign S is the specific speed limit sign SP.

In step S112, the determination unit 112 acquires the vehicle category information 122 and recognizes the first vehicle category, which is the vehicle category of the vehicle 1. Furthermore, the determination unit 112 determines whether or not the specific vehicle category indicated by the specific speed limit sign SP coincide with the first vehicle category. When the specific vehicle category is the first vehicle category (step S112; Yes), the process is put forward to step S113. On the other hand, when the specific vehicle category is not the first vehicle category (step S112; No), the process is put forward to step S114.

In step S113, the conversion unit 113 employs the posted speed limit VL-S as the first speed limit applied to the vehicle 1. In this stage, the conversion unit 113 may employ the posted speed limit VL-S as it is as the first speed limit without using the conversion table 123.

In step S114, the conversion unit 113 performs conversion processing using the conversion table 123. Specifically, the conversion unit 113 converts the posted speed limit VL-S into the prescribed speed limit VL-P with respect to the first vehicle category based on the conversion table 123. Then, the conversion unit 113 acquires the prescribed speed limit VL-P obtained through the conversion processing as the first speed limit applied to the vehicle 1. In other words, the conversion unit 113 acquires, as the first speed limit, the prescribed speed limit VL-P that is associated with the posted speed limit VL-S and the first vehicle category, based on the conversion table 123.

Notably, in the example of the conversion table 123 shown in FIG. 2, when the posted speed limit VL-S is not more than 90 kph, the posted speed limit VL-S and the prescribed speed limit VL-P with respect to each vehicle category are equal to each other. Therefore, in that case, the conversion processing does not have to be performed.

The speed limit information 124 indicates the first speed limit with respect to the vehicle 1 obtained as above. The processor 110 stores the speed limit information 124 in the storage device 120. Moreover, the processor 110 outputs the speed limit information 124 to the outside via the I/O interface 130. The speed limit information 124 can be used for various applications. Examples of use of the speed limit information 124 are described in Section 3 and Section 4 later.

1-3. Modifications

The speed limit acquiring apparatus 100 (conversion unit 113) may correct the posted speed limit VL-S into the first speed limit in consideration of the first vehicle category of the vehicle 1 without using the conversion table 123. In other words, the speed limit acquiring apparatus 100 may acquire the first speed limit by correcting the posted speed limit VL-S in accordance with the first vehicle category of the vehicle 1. For example, when the posted speed limit VL-S is not less than 100 kph and the first vehicle category of the vehicle 1 is the large vehicle, the speed limit acquiring apparatus 100 calculates the first speed limit by performing a predetermined operation on the posted speed limit VL-S. Examples of the predetermined operation include subtraction of a predetermined value (example: 20 kph) from the posted speed limit VL-S, multiplication of the posted speed limit VL-S by a correction coefficient less than 1, and the like. As another example, the speed limit acquiring apparatus 100 may correct the posted speed limit VL-S into the first speed limit using a machine learning model. Inputs to the machine learning model are the first vehicle category and the posted speed limit VL-S, and an output from the machine learning model is the first speed limit. In any of the cases, the information on the first speed limit can be acquired by correcting the posted speed limit VL-S in accordance with the first vehicle category. Thereby, an equivalent effect to that in the case of using the conversion table 123 can be obtained.

2. Second Embodiment

There is also considered a case where a speed limit indicated by a normal speed limit sign S that does not have an auxiliary sign is not necessarily applied to all vehicle categories. In other words, there is also considered a case where the speed limit indicated by the speed limit sign S is different from the first speed limit applied to the vehicle 1 in the first vehicle category. A second embodiment proposes processing in such a case. Notably, duplicate description of the first embodiment is properly omitted.

Figure 5:
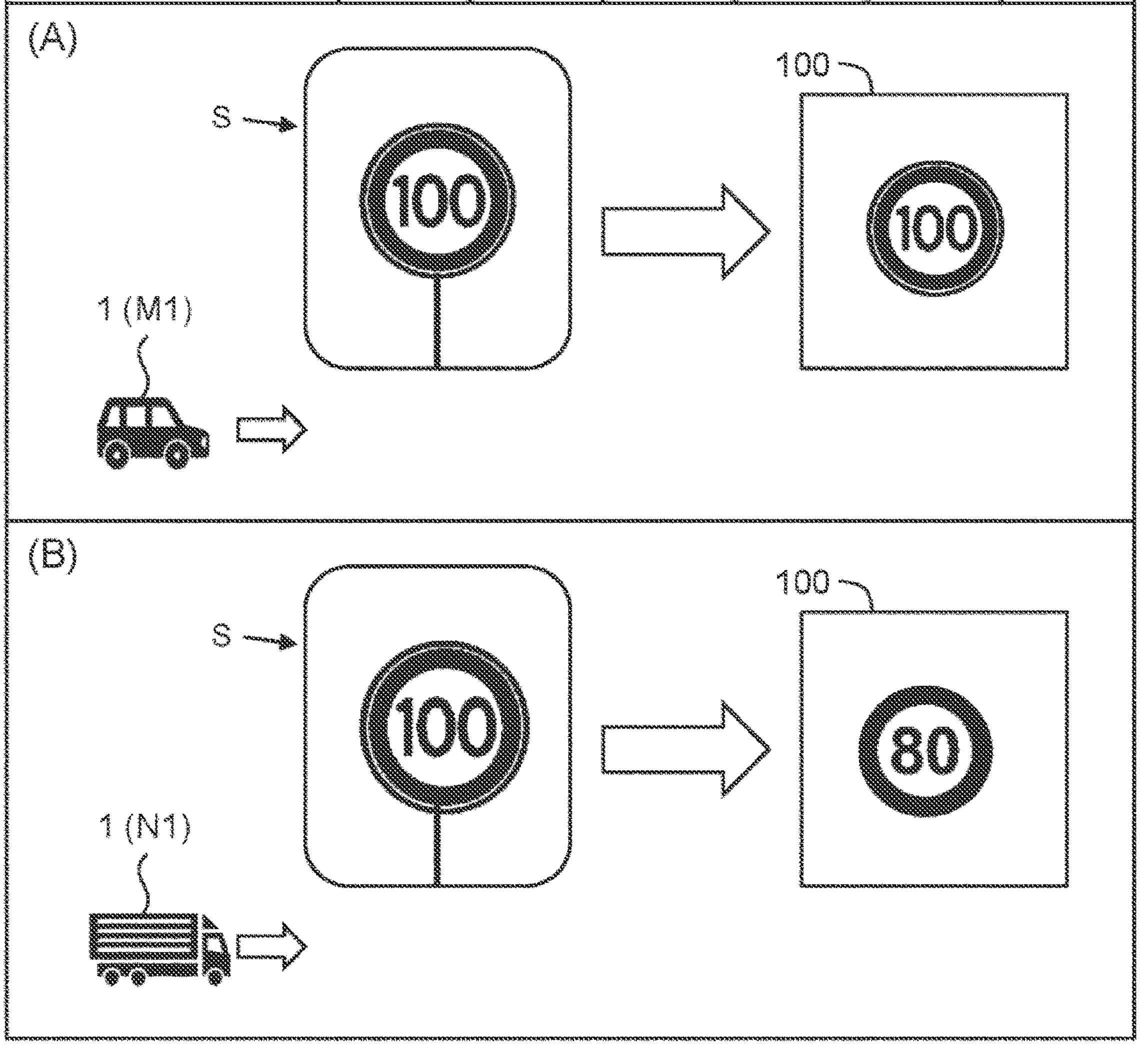
FIG. 5 is a conceptual diagram for explaining an example of processing by a speed limit acquiring apparatus according to a second embodiment.

FIG. 5 is a conceptual diagram for explaining an example of processing by the speed limit acquiring apparatus 100 according to the second embodiment. As with the first embodiment, the conversion table 123 indicates the corresponding relation between the posted speed limit VL-S and the prescribed speed limit VL-P which is beforehand prescribed for each vehicle category. In the example shown in FIG. 5, as the vehicle categories, M1, M2, M3, N1, N2, and N3 are exemplarily presented.

In the case of (A) in FIG. 5, the first vehicle category of the vehicle 1 is “M1”. The posted speed limit VL-S indicated by the speed limit sign S is 100 kph. Based on the conversion table 123, the speed limit acquiring apparatus 100 acquires, as the first speed limit, the prescribed speed limit VL-P (100 kph) associated with the posted speed limit VL-S (100 kph) and the first vehicle category (M1).

In the case of (B) in FIG. 5, the first vehicle category of the vehicle 1 is “N1”. The posted speed limit VL-S indicated by the speed limit sign S is 100 kph. Based on the conversion table 123, the speed limit acquiring apparatus 100 acquires, as the first speed limit, the prescribed speed limit VL-P (80 kph) associated with the posted speed limit VL-S (100 kph) and the first vehicle category (N1). In other words, the speed limit acquiring apparatus 100 acquires the first speed limit by converting the posted speed limit VL-S (100 kph) into the prescribed speed limit VL-P (80 kph) with respect to the vehicle category N1 based on the conversion table 123.

As described above, also with the present embodiment, the information on the first speed limit applied to the vehicle 1 can be acquired based on the posted speed limit VL-S indicated by the speed limit sign S.

Figure 6:
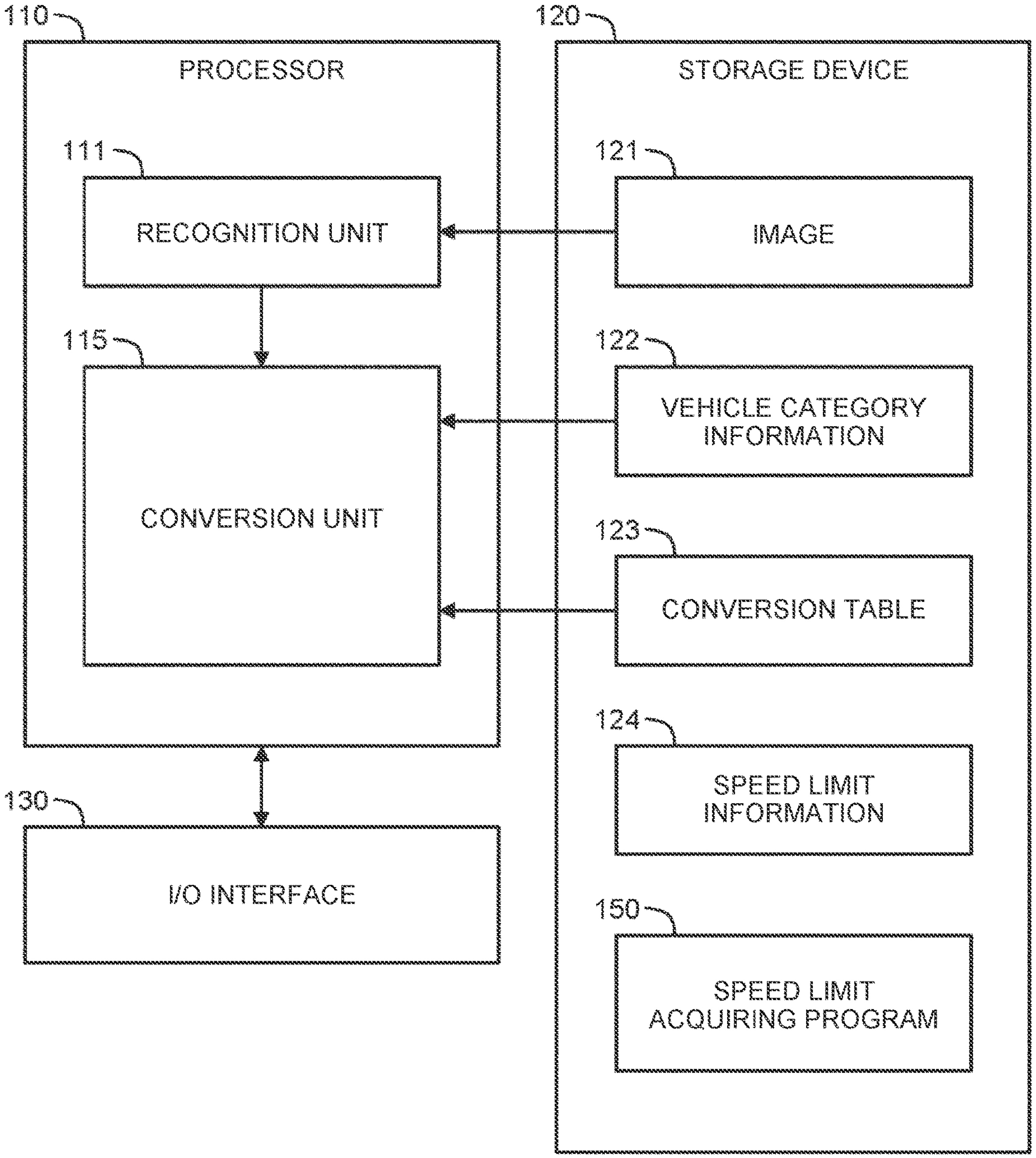
FIG. 6 is a block diagram showing a configurational example of the speed limit acquiring apparatus according to the second embodiment.

FIG. 6 is a block diagram showing a configurational example of the speed limit acquiring apparatus 100 according to the second embodiment. Duplicate description of the first embodiment is omitted. The processor 110 includes the recognition unit 111 and a conversion unit 115 as functional blocks. These functional blocks are realized by the processor 110 executing the speed limit acquiring program 150.

Figure 7:
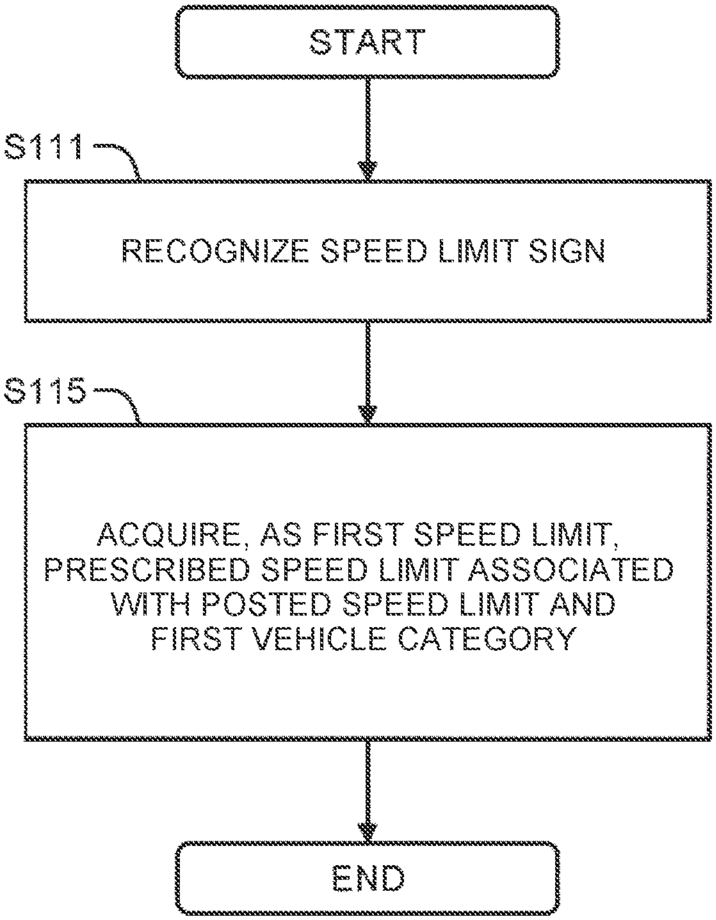
FIG. 7 is a flowchart showing processing by the speed limit acquiring apparatus according to the second embodiment.

FIG. 7 is a flowchart showing processing by the speed limit acquiring apparatus 100 according to the second embodiment.

In step S111, the recognition unit 111 recognizes the speed limit sign S installed on the road where the vehicle 1 is travelling. Then, the recognition unit 111 acquires information on the posted speed limit VL-S indicated by the speed limit sign S. This step S111 is equivalent to that in the case of the first embodiment.

In step S115, the conversion unit 115 acquires the vehicle category information 122 indicating the first vehicle category of the vehicle 1. Furthermore, based on the conversion table 123, the conversion unit 115 acquires, as the first speed limit, the prescribed speed limit VL-P associated with the posted speed limit VL-S and the first vehicle category. In other words, the speed limit acquiring apparatus 100 acquires the first speed limit by converting the posted speed limit VL-S into the prescribed speed limit VL-P with respect to the first vehicle category based on the conversion table 123.

As a modification, the speed limit acquiring apparatus 100 (conversion unit 115) may correct the posted speed limit VL-S into the first speed limit in consideration of the first vehicle category of the vehicle 1 without using the conversion table 123. In other words, the speed limit acquiring apparatus 100 may acquire the first speed limit by correcting the posted speed limit VL-S in accordance with the first vehicle category of the vehicle 1. For example, when the posted speed limit VL-S is not less than 100 kph and the first vehicle category of the vehicle 1 is other than M1, the speed limit acquiring apparatus 100 calculates the first speed limit by performing a predetermined operation on the posted speed limit VL-S. Examples of the predetermined operation include subtraction of a predetermined value (example: 20 kph) from the posted speed limit VL-S, multiplication of the posted speed limit VL-S by a correction coefficient less than 1, and the like. As another example, the speed limit acquiring apparatus 100 may correct the posted speed limit VL-S into the first speed limit using a machine learning model. Inputs to the machine learning model are the first vehicle category and the posted speed limit VL-S, and an output from the machine learning model is the first speed limit. In any of the cases, the information on the first speed limit can be obtained by correcting the posted speed limit VL-S in accordance with the first vehicle category. Thereby, an equivalent effect to that in the case of using the conversion table 123 can be obtained.

The speed limit information 124 indicates the first speed limit with respect to the vehicle 1 obtained as above. The processor 110 stores the speed limit information 124 in the storage device 120. Moreover, the processor 110 outputs the speed limit information 124 to the outside via the I/O interface 130. The speed limit information 124 can be used for various applications. Examples of use of the speed limit information 124 are described below.

3. Information Notification System

An information notification system 200 is applied to the vehicle 1 and notifies the user O of the vehicle 1 of various kinds of information. The information notification system 200 may be mounted on the vehicle 1 or may be included in a remote operator terminal manipulated by a remote operator. Otherwise, the information notification system 200 may be distributedly arranged in the vehicle 1 and the remote operator terminal.

Figure 8:
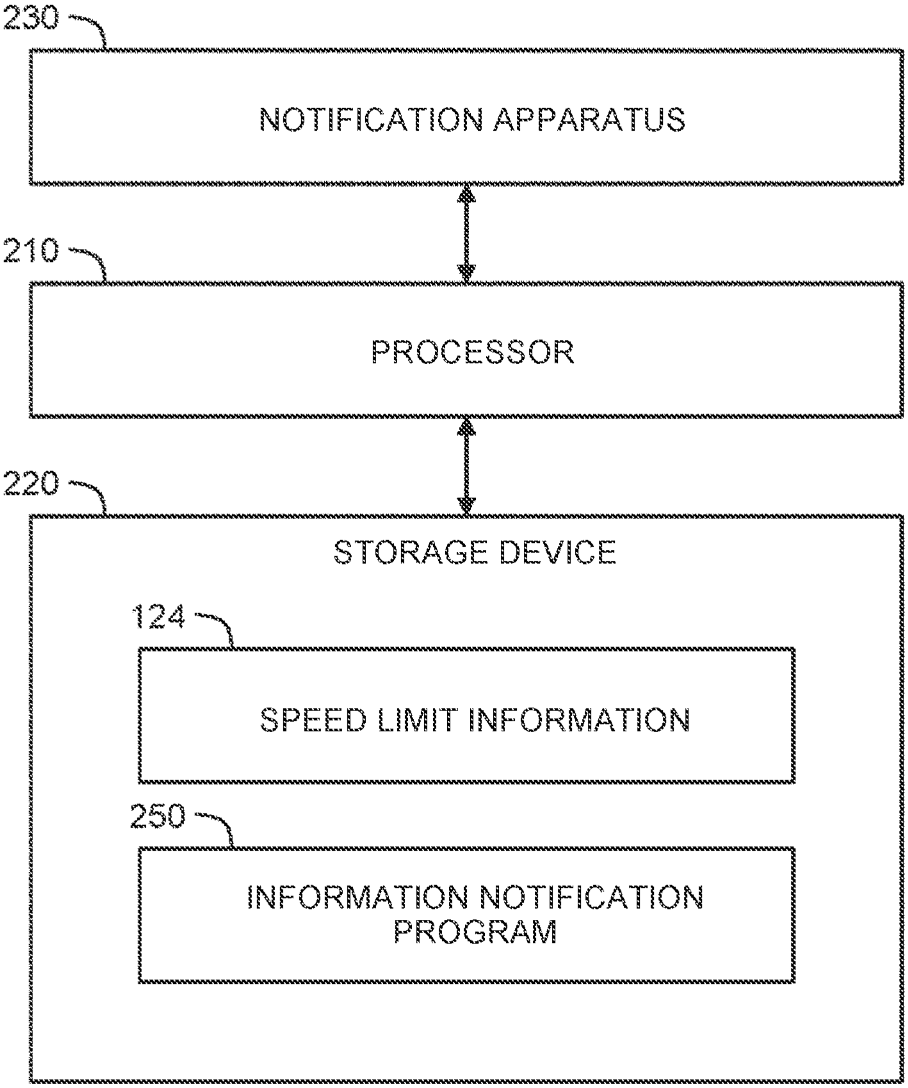
FIG. 8 is a block diagram showing a configurational example of an information notification system.

FIG. 8 is a block diagram showing a configurational example of the information notification system 200. The information notification system 200 includes one or a plurality of processors 210 (hereinafter simply called processor 210) and one or a plurality of storage devices 220 (hereafter simply called storage device 220). The processor 210 performs various kinds of processing. For example, the processor 210 includes a CPU. The storage device 220 stores various kinds of information. Examples of the storage device 220 include a volatile memory, a nonvolatile memory, a HDD, an SSD, and the like.

The information notification system 200 further includes a notification apparatus 230. The notification apparatus 230 is an apparatus for notifying the user O of the vehicle 1 of various kinds of information. When the user O is a driver on board in the vehicle 1, the notification apparatus 230 is mounted on the vehicle 1. When the user O is a remote operator, the notification apparatus 230 is included in the remote operator terminal. For example, the notification apparatus 230 includes a display apparatus. Examples of the display apparatus include a meter panel, a display, a head-up display (HUD), and the like. As another example, the notification apparatus 230 may include a loudspeaker.

An information notification program 250 is a computer program executed by the processor 210. By the processor 210 executing the information notification program 250, various kinds of processing by the information notification system 200 are realized. The information notification program 250 is stored in the storage device 220. Otherwise, the information notification program 250 may be recorded in a computer-readable recording medium.

The processor 210 acquires the speed limit information 124 from the aforementioned speed limit acquiring apparatus 100. The speed limit information 124 is stored in the storage device 220. The processor 210 notifies the user O of the vehicle 1 of the information on the first speed limit indicated by the speed limit information 124 via the notification apparatus 230. For example, the processor 210 displays the information on the first speed limit on the display apparatus. The information on the first speed limit may be an image and/or an icon of the speed limit sign S or may be the numerical value of the first speed limit. As another example, the processor 210 may output, from the loudspeaker, sound information of reporting the first speed limit.

Moreover, the processor 210 may warn the user O of the vehicle 1 via the notification apparatus 230 when the vehicle speed of the vehicle 1 exceeds the first speed limit. The vehicle speed of the vehicle 1 is obtained from a vehicle control system 300 mentioned later.

Notably, the speed limit acquiring apparatus 100 and the information notification system 200 may share a common portion. The speed limit acquiring apparatus 100 may be a part of the information notification system 200. Namely, the processor 110 and the processor 210 may at least share a common portion, and the storage device 120 and the storage device 220 may at least share a common portion.

4. Vehicle Control System

Figure 9:
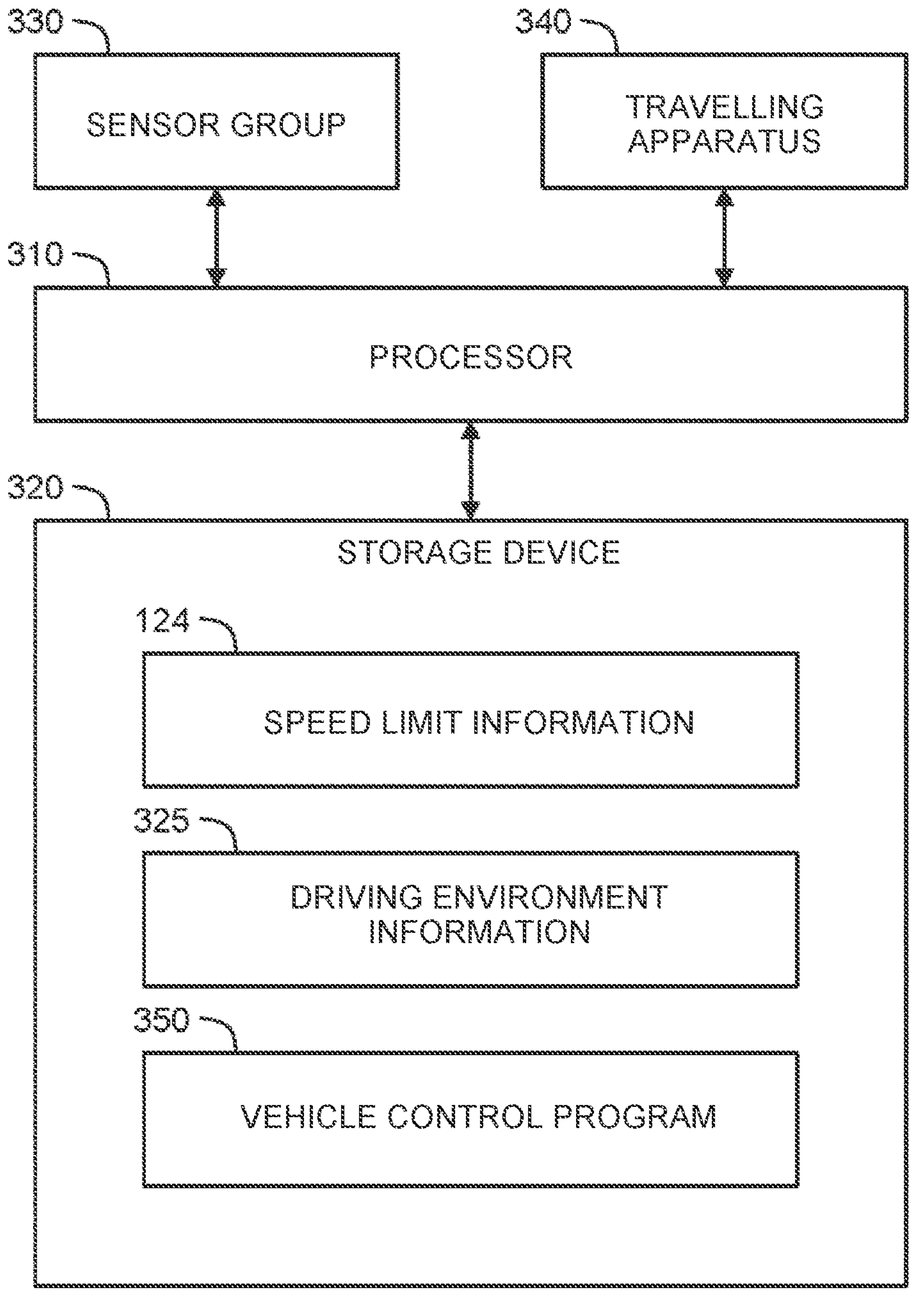
FIG. 9 is a block diagram showing a configurational example of a vehicle control system.

FIG. 9 is a block diagram showing a configurational example of the vehicle control system 300. The vehicle control system 300 is applied to the vehicle 1 and controls the vehicle 1. The vehicle control system 300 includes one or a plurality of processors 310 (hereinafter simply called processor 310), one or a plurality of storage devices 320 (hereinafter simply called storage device 320), a sensor group 330, and a travelling apparatus 340. The processor 310 performs various kinds of processing. For example, the processor 310 includes a CPU. The storage device 320 stores various kinds of information. Examples of the storage device 320 include a volatile memory, a nonvolatile memory, a HDD, an SSD, and the like.

The sensor group 330 is mounted on the vehicle 1. The sensor group 330 includes a recognition sensor, a vehicle state sensor, a position sensor, and the like. The recognition sensor includes the in-vehicle camera C. The in-vehicle camera C images a situation around the vehicle 1 and acquires the image 121 indicating the situation around the vehicle 1. The recognition sensor may include a LIDAR and the like. The vehicle state sensor detects states of the vehicle 1. For example, the vehicle state sensor includes a vehicle speed sensor that detects the vehicle speed of the vehicle 1. The position sensor includes a global navigation satellite system (GNSS) sensor.

The travelling apparatus 340 is mounted on the vehicle 1. The travelling apparatus 340 includes a steering system, a drive device, and a braking device. The steering system steers wheels. The drive device is a motive power source that generates driving force. Examples of the drive device include an engine, a motor, an in-wheel motor, and the like. The braking device generates braking force.

A vehicle control program 350 is a computer program executed by the processor 310. By the processor 310 executing the vehicle control program 350, various kinds of processing by the vehicle control system 300 are realized. The vehicle control program 350 is stored in the storage device 320. Otherwise, the vehicle control program 350 may be recorded in a computer-readable recording medium.

The processor 310 acquires driving environment information 325 indicating a driving environment of the vehicle 1 using the sensor group 330. The driving environment information 325 is stored in the storage device 320.

The driving environment information 325 includes surrounding situation information indicating the recognition result by the recognition sensor. For example, the surrounding situation information includes the image 121 captured by the in-vehicle camera C. The surrounding situation information may include object information regarding objects around the vehicle 1. Examples of the objects around the vehicle 1 include pedestrians, other vehicles, white lines, lights, signs, roadside structures, and the like. The signs include the speed limit sign S. The object information indicates relative positions and relative speeds of the objects relative to the vehicle 1.

Moreover, the driving environment information 325 includes vehicle state information indicating the vehicle states detected by the vehicle state sensor. Furthermore, the driving environment information 325 includes positional information on the vehicle 1 obtained by the position sensor.

The processor 310 performs vehicle travelling control to control travelling of the vehicle 1. The vehicle travelling control includes steering control, drive control, and braking control. The processor 310 performs the vehicle travelling control by controlling the travelling apparatus 340 (the steering system, the drive device, and the braking device).

The processor 310 may perform autonomous driving control based on the driving environment information 325. More in detail, the processor 310 generates a travelling plan of the vehicle 1 based on the driving environment information 325. Furthermore, the processor 310 generates a target trajectory required for the vehicle 1 travelling in accordance with the travelling plan, based on the driving environment information 325. The target trajectory includes target positions and target speeds. Then, the processor 310 performs the vehicle travelling control such that the vehicle 1 follows the target trajectory.

The processor 310 acquires the speed limit information 124 from the aforementioned speed limit acquiring apparatus 100. The speed limit information 124 is stored in the storage device 320. The processor 310 performs the vehicle travelling control based on the first speed limit indicated by the speed limit information 124.

For example, the processor 310 sets a set speed which links with the first speed limit. For example, the set speed is set to be equal to the first speed limit. As another example, the set speed may be set to a value obtained by subtracting a fixed value from the first speed limit. Then, even when there is no accelerator manipulation by the operator of the vehicle 1, the processor 310 automatically keeps the vehicle speed of the vehicle 1 to be the set speed.

As another example, the processor 310 may perform vehicle speed limiting control to limit the vehicle speed of the vehicle 1. A requested vehicle speed for the vehicle 1 is determined in accordance with an amount of accelerator manipulation by the operator of the vehicle 1. Otherwise, the requested vehicle speed is determined by the autonomous driving system. When the requested vehicle speed exceeds the set speed, the processor 310 automatically lowers a vehicle speed V of the vehicle 1 down to the set speed. Therefore, even when the operator of the vehicle 1 keeps stepping on the accelerator pedal and the requested vehicle speed exceeds a set speed Vs, the vehicle speed is automatically kept to be the set speed. Moreover, when the speed limit of the road changes and the current vehicle speed exceeds the set speed, the processor 310 automatically decelerates the vehicle 1 such that the vehicle speed becomes not more than the set speed.

Notably, the speed limit acquiring apparatus 100 and the vehicle control system 300 may share a common portion. The speed limit acquiring apparatus 100 may be a part of the vehicle control system 300. Namely, the processor 110 and the processor 310 may at least share a common portion, and the storage device 120 and the storage device 320 may at least share a common portion.

5. Information Processing System

An information processing system 400 applied to the vehicle 1 includes at least one of the information notification system 200 and the vehicle control system 300. The information processing system 400 may include both the information notification system 200 and the vehicle control system 300.

Notably, in the aforementioned embodiments, the speed limit indicated by the speed limit sign S has been discussed. The technical ideas according to the present disclosure can be also applied to traffic rules indicated by other traffic signs in the similar manner. Examples of the other traffic rules include a minimum speed limit, an advancing direction at an intersection, no entry, and the like. For generalization, "speed limit", "speed limit sign", "posted speed limit", "prescribed speed limit", and "first speed limit" in the aforementioned embodiments are supposed to be replaced by "traffic rule", "traffic sign", "posted traffic rule", "prescribed traffic rule", and "first traffic rule", respectively.

Figure 10:
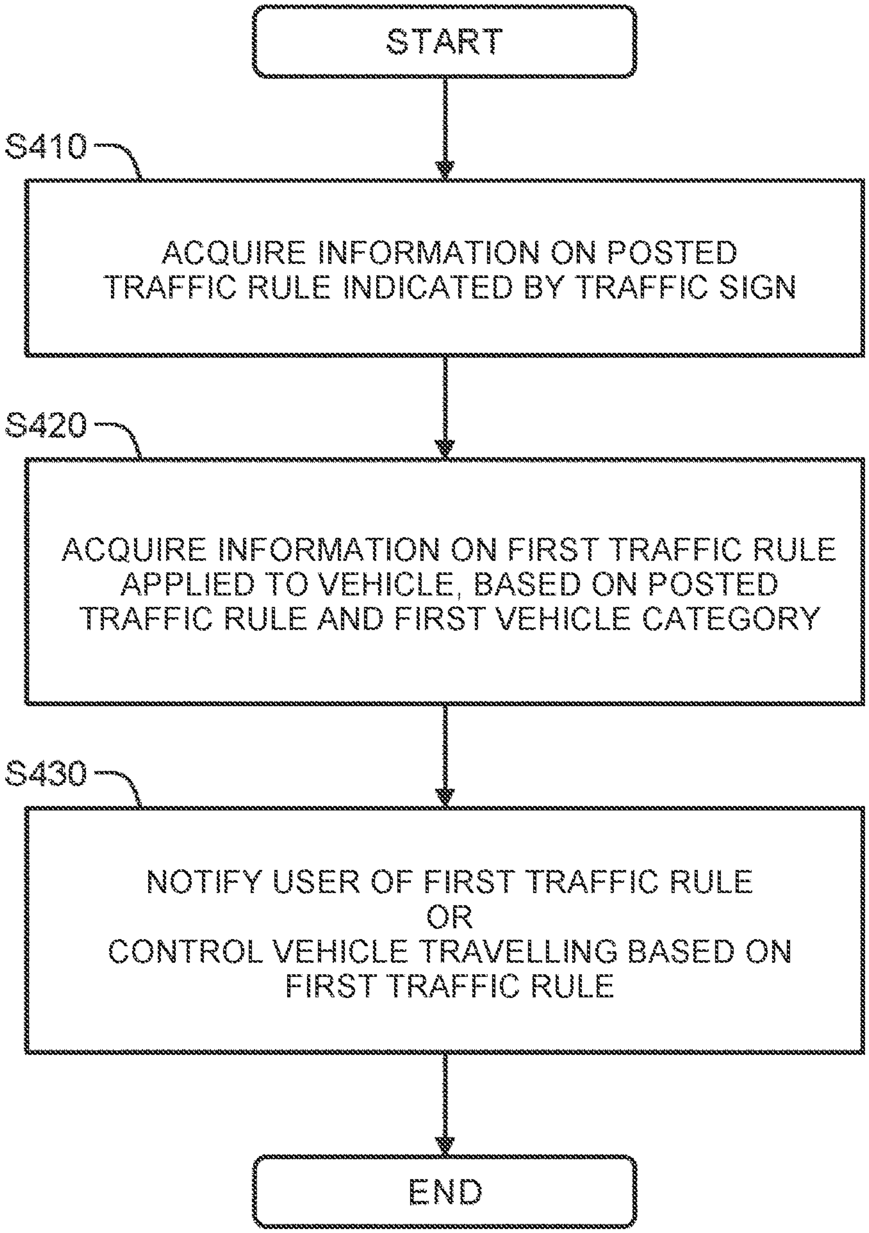
FIG. 10 is a flowchart showing a summary of processing of an information processing system.

FIG. 10 is a flowchart showing a summary of processing by the information processing system 400 applied to the vehicle 1. In step S410, the information processing system 400 recognizes a traffic sign installed on a road where the vehicle 1 travels, and acquires information on a posted traffic rule that is a traffic rule indicated by the traffic sign. In step S420, the information processing system 400 acquires information on a first traffic rule applied to the vehicle 1 in the first vehicle category, based on the posted traffic rule and the first vehicle category. For example, the information processing system 400 acquires, as the first traffic rule, a prescribed traffic rule that is associated with the posted traffic rule and the first vehicle category, based on the conversion table 123. As another example, the information processing system 400 may acquire the first traffic rule by correcting the posted traffic rule in accordance with the first vehicle category. Then, in step S430, the information processing system 400 notifies the user O of the vehicle 1 of the first traffic rule or controls travelling of the vehicle 1 based on the first traffic rule.

What is claimed is:

1. An information processing system applied to a vehicle, the information processing system comprising:

- one or more storage devices that store a table indicating a corresponding relation between a posted speed limit and a prescribed speed limit for a plurality of vehicle categories; and
- one or more processors configured to
  - acquire first information of a posted speed limit indicated by a specific speed limit sign installed on a road where the vehicle travels, the specific speed limit sign applying to a specific vehicle category,
  - acquire, when the specific vehicle category is not a first vehicle category of the plurality of vehicle categories, the first vehicle category being a vehicle category of the vehicle, second information of a first speed limit applicable to the vehicle by converting the posted speed limit into the prescribed speed limit associated with the posted speed limit and the first vehicle category based on the table, and
  - notify a user of the vehicle of the first speed limit by displaying the first speed limit on a display apparatus of the vehicle or control travelling of the vehicle based on the first speed limit.

2. The information processing system according to claim 1, wherein the one or more processors are configured to acquire, as the first speed limit, the posted speed limit indicated by the specific speed limit sign when the specific vehicle category is the first vehicle category.

3. The information processing system according to claim 1, wherein the first information of the posted speed limit indicated by the specific speed limit sign includes information on the posted speed limit indicated by the specific speed limit sign and information on the specific vehicle category.

4. The information processing system according to claim 3, wherein the specific speed limit sign is a combination of a main sign indicating the posted speed limit and an auxiliary sign indicating whether the posted speed limit is applied to the specific vehicle category;

the vehicle includes an in-vehicle camera configured to image a situation around the vehicle; and the one or more processors are configured to acquire the information on the posted speed limit and the information on the specific vehicle category by recognizing the main sign and the auxiliary sign based on an image captured by the in-vehicle camera.

5. A speed limit acquiring apparatus configured to acquire information on a speed limit applicable to a vehicle, the speed limit acquiring apparatus comprising:

one or more storage devices that store a table indicating a corresponding relation between a posted speed limit and a prescribed speed limit for a plurality of vehicle categories; and one or more processors configured to acquire first information of a posted speed limit indicated by a specific speed limit sign installed on a road where the vehicle travels, the specific speed limit sign applying to a specific vehicle category, and acquire, when the specific vehicle category is not a first vehicle category of the plurality of vehicle categories, the first vehicle category being a vehicle category of the vehicle, second information of a first speed limit applicable to the vehicle by converting the posted speed limit into the prescribed speed limit associated with the posted speed limit and the first vehicle category based on the table.

* * * * *